United States Patent [19]

Grey

[11] 4,303,169
[45] Dec. 1, 1981

[54] SAFETY CONTROL SYSTEM FOR CONTAINER OPERATIONS

[76] Inventor: Vincent G. Grey, Falls Church, Va.

[21] Appl. No.: 922,208

[22] Filed: Jul. 6, 1978

[51] Int. Cl.² ........................................... B65D 88/00
[52] U.S. Cl. ...................................... 220/1.5; 403/240
[58] Field of Search .......... 254/194, 195, 196, 190 R, 254/188; 220/1.5, 23.4; 24/201 HE, 221 R; 105/366 R, 367; 248/1, 79, 176, 177, 359, 75, 77, 80, 158; 242/86; 403/252, 240; 51/127

[56] References Cited

U.S. PATENT DOCUMENTS

| | | | |
|---|---|---|---|
| 1,079,445 | 11/1913 | Smith | 403/252 |
| 1,420,589 | 6/1922 | Talbott | 248/158 |
| 2,516,969 | 8/1950 | Fettig | 254/188 |
| 2,654,571 | 10/1953 | Albright, Jr. | 254/194 |
| 2,854,893 | 10/1958 | Henshall | 403/240 |
| 3,107,024 | 10/1963 | Johnson et al. | 220/1.5 |
| 3,972,425 | 8/1976 | DiMartino | 220/1.5 |
| 3,980,185 | 9/1976 | Cain | 220/1.5 |
| 4,068,878 | 1/1978 | Wilner | 403/252 |

FOREIGN PATENT DOCUMENTS 499201  3/1976  U.S.S.R. ............................. 220/1.5

Primary Examiner—Kenneth W. Noland

[57] ABSTRACT

The system for safety control utilizes an anchoring device including mounting structure at one end for mounting the device removably on a corner fitting of a container by engagement in any one of the several apertures of the corner fitting, and structure at the other end for supporting safety control equipment such as ladders, stages, lights, fire hoses, lifelines, and so forth.

14 Claims, 20 Drawing Figures

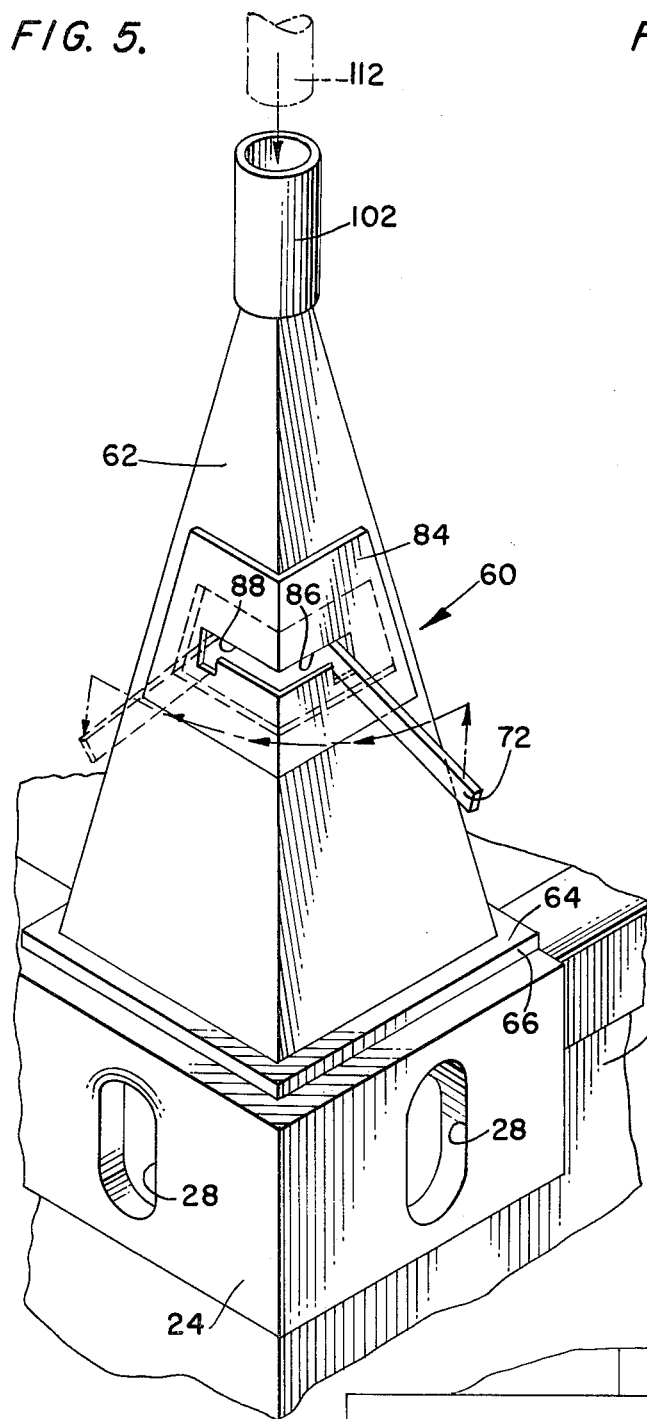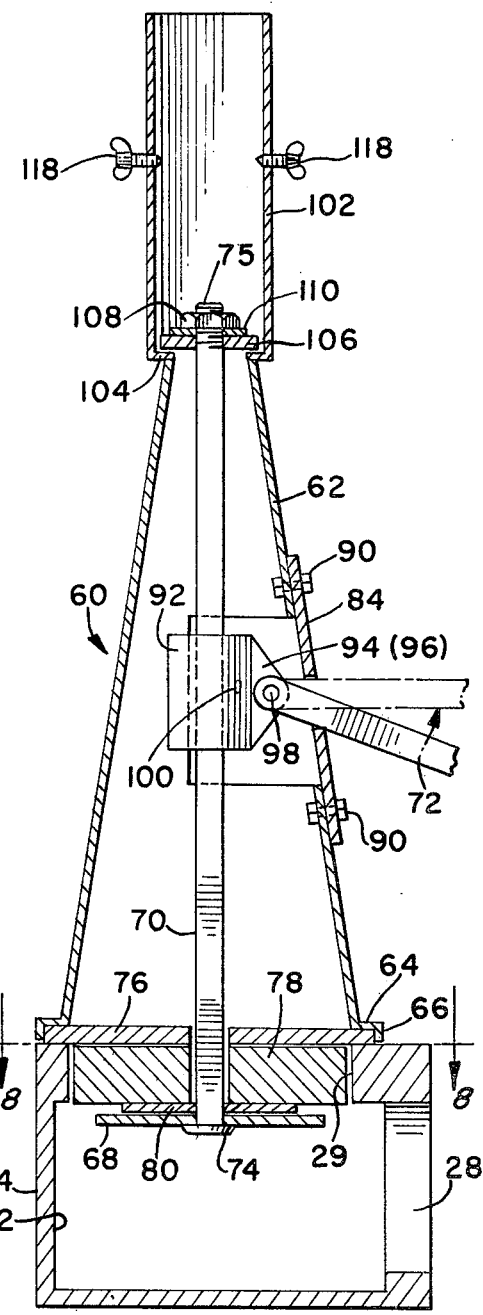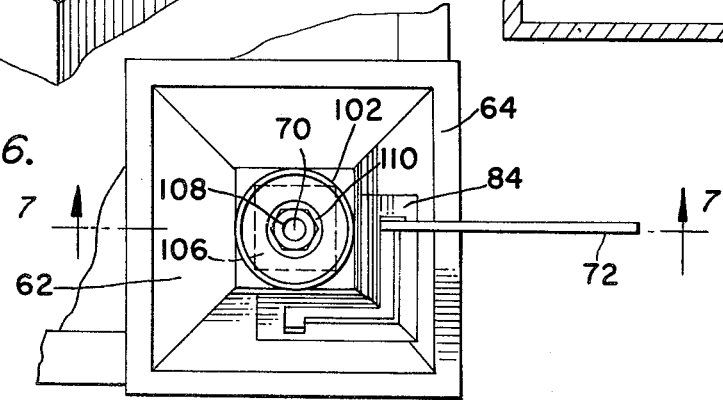

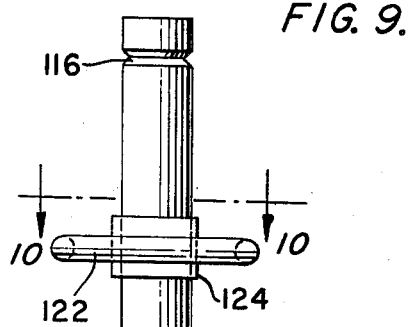
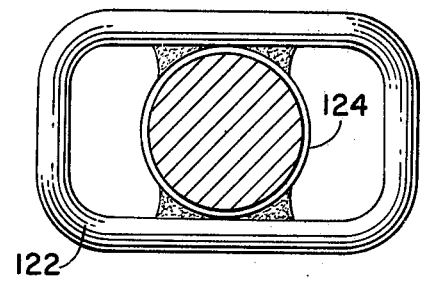
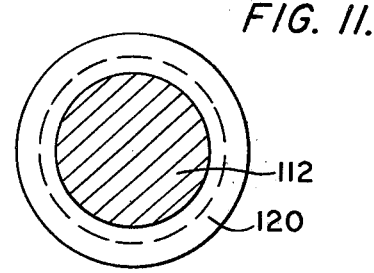
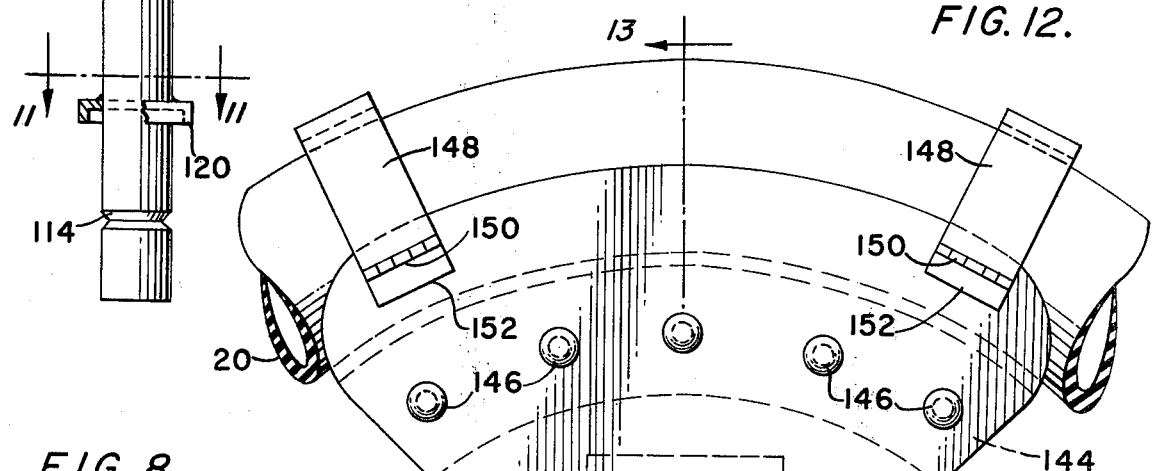
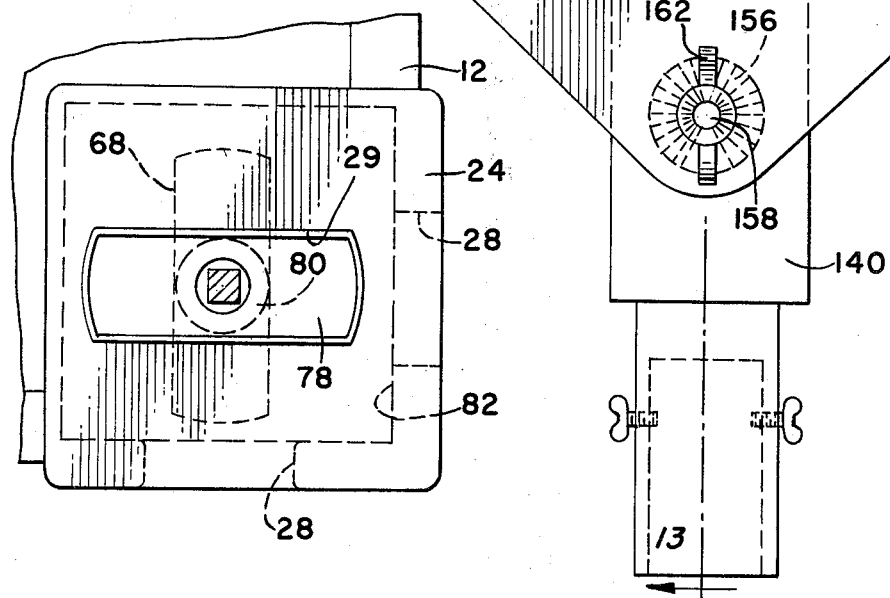

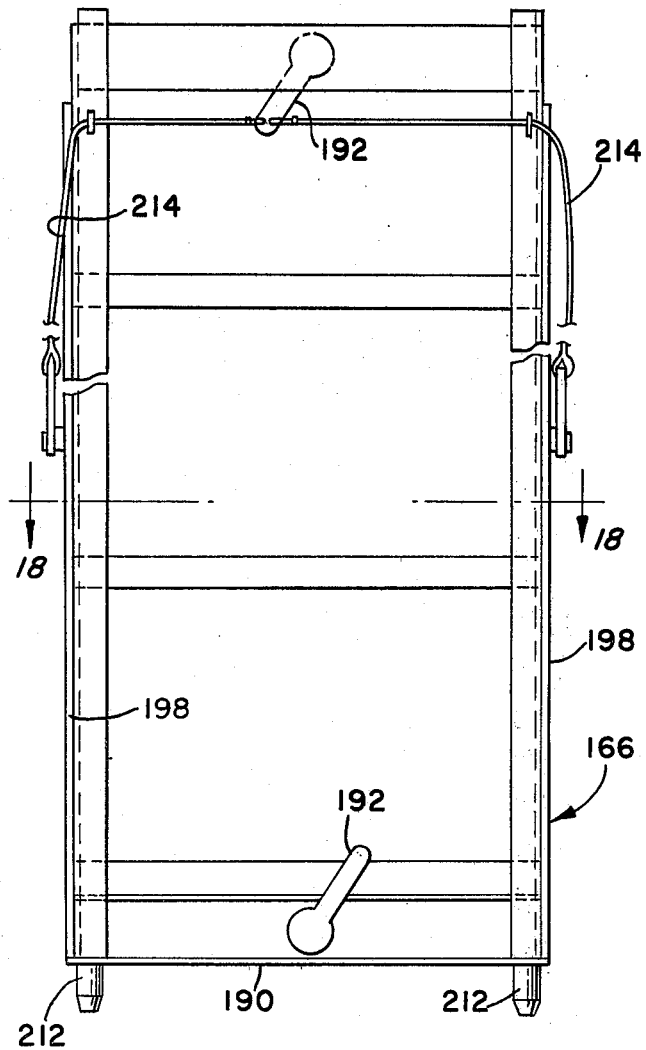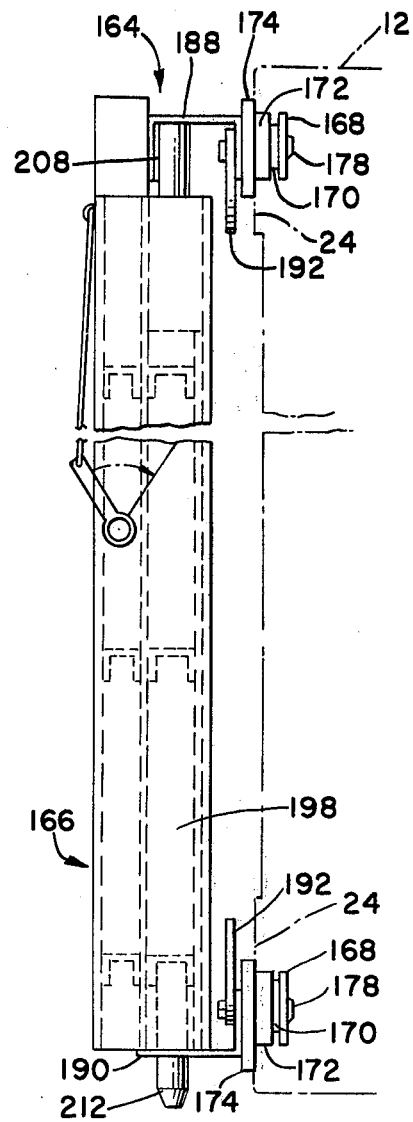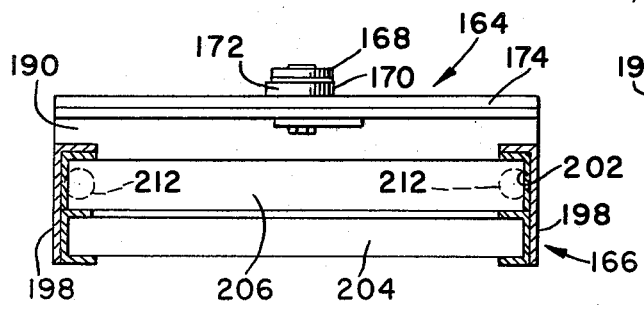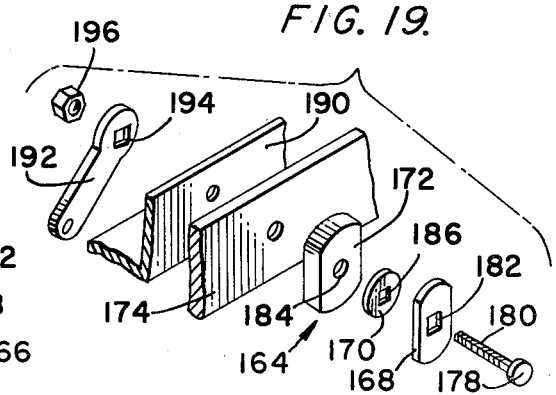

SAFETY CONTROL SYSTEM FOR CONTAINER OPERATIONS

BACKGROUND OF THE INVENTION

1. Field of the Invention

The present invention is directed to a system for safety control utilizing an anchoring device capable of supporting safety control equipment and including mounting structure at one end for removably mounting the anchoring device and the equipment on a corner fitting of a container.

2. Description of the Prior Art

With the advent of the container concept and containerization, it has been possible to load cargo into a container comprising a specially constructed intermodal semi-trailer at a plant, warehouse or any other location, ship that container by rail, truck and/or ship and unload the container for the first time at the final destination. Shipment by sea will be by ships characterized as "containerships" and the containers to be carried by the containerships are constructed according to an industry and world-wide standardization scheme. In this manner, it will be possible to handle the containers thereby to load and unload the same from the beds of trucks, rail flatcars and into the hold and on deck locations of the containership. Transport of the container by containership envisions in both loading environments the stacking of containers in tiers such that there may be a number of tiers in the hold and a further number of tiers on deck.

In particular, the container may be about 8-9 feet in height so it readily may be seen that a problem in gaining access to the top of a single container is magnified if containers are loaded on the containership as they normally are in a number of tiers. And, once having gained access to the top of the containers for required purposes, there is little or no support for a member of the crew which becomes a particular problem under conditions of bad weather and/or pitching and rolling of the containership.

Anchoring devices such as a clamp for removably mounting a cable guide to a boat, see U.S. Pat. No. 2,516,969 to T. V. Fettig, and a socket mounted to the bed of a truck for mounting a sheave block, see U.S. Pat. No. 2,654,571 to E. G. Albright, Jr., are known; yet, these anchoring devices require intermediate, separate components for mounting rather than having the capability of being mounted directly to the surface which provides the ultimate support. Further, these anchoring devices have little or no applicability in the system for safety control as described herein.

SUMMARY OF THE INVENTION

The present invention is directed to an improvement in safety control systems and in anchoring devices adapted to be removably mounted directly with one of several apertures in the corner fitting of a container for cargo.

Several forms of the anchoring device of the present invention will be described hereinafter but in each the anchoring device is directly mounted both rapidly and securely for purposes of safety control to the corner fitting without any intermediate supporting structure. One, two or three anchoring devices according to the number of exposed apertures may be mounted to each corner fitting without in any manner obstructing the mounting location of another anchoring device. The anchoring device includes structure at the end opposite to the end adapted to be mounted to the corner fitting for supporting safety equipment for gaining access to the top of a container or tier of containers, a platform which may be suspended in cantilever fashion from two or more anchoring devices, and, additionally, a stanchion which, in turn, may support a guide for guiding and positioning a fire hose or a cluster of lights or any other safety control device such as a lifeline which may be connected to the stanchion.

The anchoring device has capability of being mounted to the corner fitting of a container by engagement either in the end or side aperture of the corner fitting or the top aperture of the corner fitting. In one form of the present invention, the anchoring device includes mounting structure having a plug of substantially the outline of the aperture into which it is received, a shaft extending through the plug and carrying a latch for engagement with an inner surface of the corner fitting adjacent the aperture and a bearing plate which is drawn into a locked engagement with the outer surface of the corner fitting adjacent the aperture. The mounting structure is supported by a base unit including a socket at the opposite end for receiving a stanchion and additional safety control structures.

In a second form, the anchoring device includes mounting structure comprised of a shaft having a base including a pair of extending shoulders one of which is adapted to engage the inner surface of the corner fitting adjacent the aperture and the other of which is adapted to be engaged by a latch which extends between a further portion of the inner surface and the outer surface spaced from the first-mentioned surface by the thickness of the corner fitting. The latch is moved into engaging relation with both surfaces and the other shoulder by a nut which may be threaded on the shaft against the latch.

The anchoring devices as heretofore generally described have universal use in and in combination with any of the apertures of any corner fitting in any container. Thus, the anchoring devices may be mounted both in a position to extend horizontally from the side of a container and vertically from the top of a container. The anchoring device may support a plurality of different safety control devices such as a cluster lamp, a lifeline to provide safety at the perimeter of the containers in any container location, a support having capability, also, of guiding movement of a fire hose, ladders, stages and planks for use in gaining access to the top of a container disposed laterally of a second container. The anchoring device may also be used in providing lashing for containers.

Thus, it can be seen that the safety control system has the unique capability of implementation with a corner fitting of a container of cargo for supporting fire hoses which are unweildly because of their own weight, yet extremely so when filled with water and subject to reaction forces and a static head pressure required in use at elevated tiers of containers in any container location; or for supporting other safety control devices as heretofore mentioned. As a particular advantage, the anchoring device is readily portable and easily mounted in any particular location to effect a mounting procedure, as required.

Further advantages of the anchoring devices of the present invention will become more clearly apparent as the description continues.

DESCRIPTION OF THE DRAWING

FIG. 5 is a perspective view of another form of anchoring device mounted in a top aperture of a corner fitting;

FIG. 6 is a plan view of the anchoring device of FIG. 5;

FIG. 7 is a view in section as seen along the line 7—7 in FIG. 6;

FIG. 8 is a view in section as seen along the line 8—8 in FIG. 7;

FIG. 9 is a view in elevation of a stanchion for use with the anchoring device of FIG. 5;

FIG. 10 is a view in section as seen along the line 10—10 in FIG. 9;

FIG. 11 is a view in section as seen along the line 11—11 in FIG. 9;

FIG. 12 is a view in elevation of a support and guide for a fire hose for use with the stanchion of FIG. 9;

FIG. 16 is a view in front elevation of a ladder to be supported along the side of a container;

FIG. 17 is a view in side elevation of the ladder of FIG. 16 illustrating the manner of support of the ladder to a container;

FIG. 18 is a top plan view of the ladder of FIG. 16;

FIG. 19 is an exploded perspective view of the several components of the anchoring device for mounting the bottom of the ladder of FIG. 16 along the container.

DESCRIPTION OF THE PREFERRED EMBODIMENTS

Figure 1:
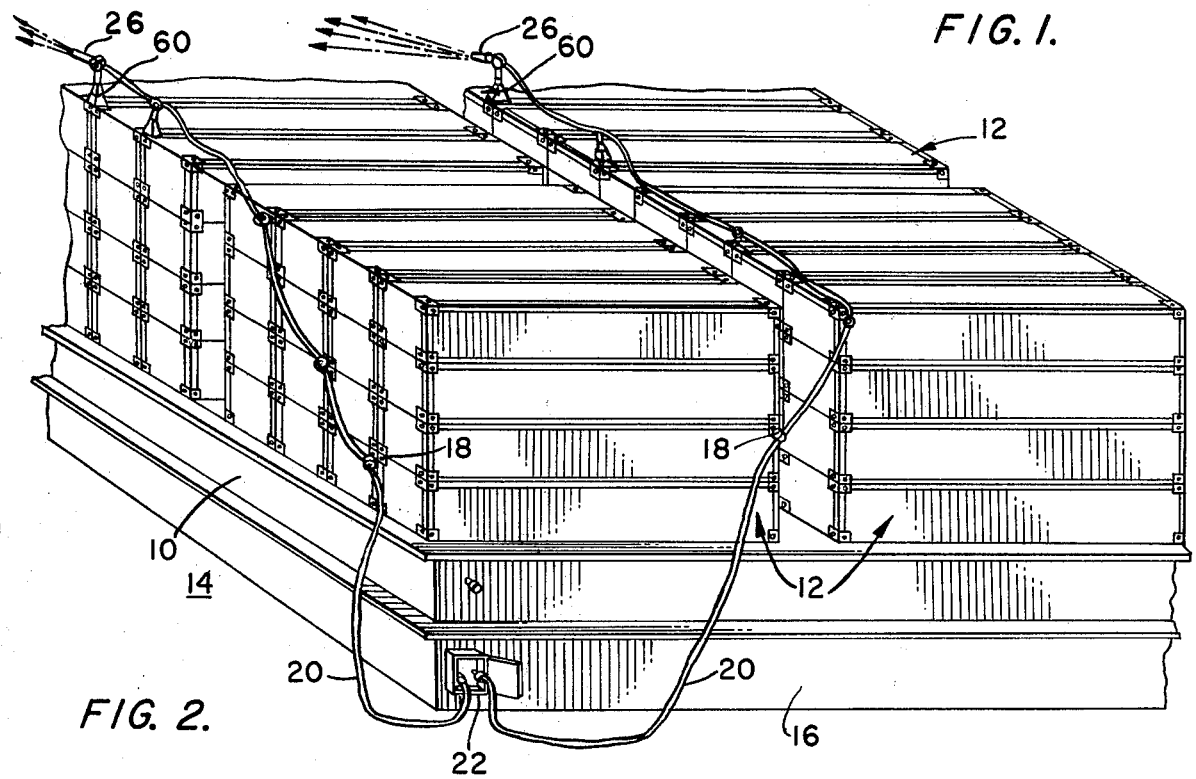
FIG. 1 is a perspective view of a typical container location on the deck of a containership illustrating a plurality of containers arranged in tiers in each location.

As may be seen in FIG. 1, illustrating the environment of use, the anchoring device of the safety and fire control system is attached securely, yet removably, to a corner fitting of a container in both a vertical and horizontal attitude. And, the specification will continue with a discussion of the several forms of anchoring device for support of fire fighting and/or safety equipment including ladders and platforms for use in the servicing of cargo and stanchions for support of a lifeline, a cluster lamp and the like as warranted by a particular situation.

While the container, per se, forms no part of the present invention, the corner fitting of the container is important in the context of the invention in that it provides a location for receipt of the anchoring device for support of the safety and fire control equipment generally described above and to be particularly discussed hereafter. The anchoring device may be releasably, and with structural stability, attached to the corner fitting through cooperation with any aperture therein. Structural stability is assured since the corner fitting is the strongest part of the container.

With continued reference to FIG. 1, there is illustrated a plurality of cargo locations located atop a hatch cover 10; and in each cargo location a plurality of containers 12 are arranged four (4) abreast and in four (4) tiers. The hatch cover closes the opening to a hold below the deck 14 and is supported by coaming 16. While the specification, above, suggests the use of the anchoring device on shipboard, it should be appreciated that the anchoring device is not restricted to such use and is equally applicable to use at any location where there are containers.

The arrangement of cargo above deck, as in FIG. 1, creates a situation of special hazard to crew members trying to fight a fire in, around or on top of the containers, or for that matter in taking any action which may require a crew member to mount or partially mount the cargo. As discussed, the height of each container 12 is such that the uppermost surface may be approximately 30-40 feet above the deck when taking into consideration the vertical dimension of each of the coaming and hatch cover.

It is, therefore, an important aspect of the invention to provide a safety control system to assist the crew of a ship in the fighting of a fire or in the taking of any preventive action concerning the cargo above deck. The anchoring device to be described, which may be releasably mounted at any corner fitting of any container 12, yet with equal facility may be relocated to another corner fitting, comprises an integral part of the safety control system.

Figure 2:
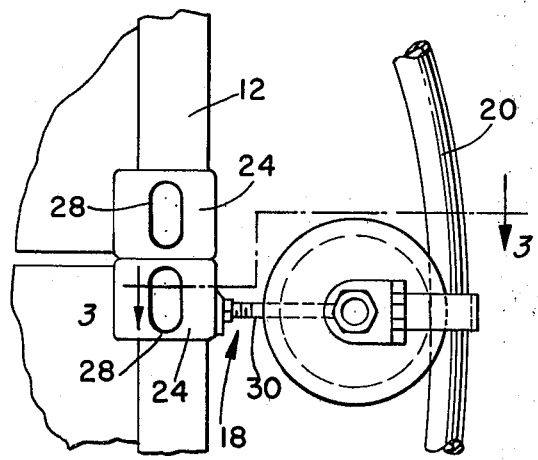
FIG. 2 is a view in elevation of one form of anchoring device mounted either in a side or end aperture of a corner fitting.
Figure 3:
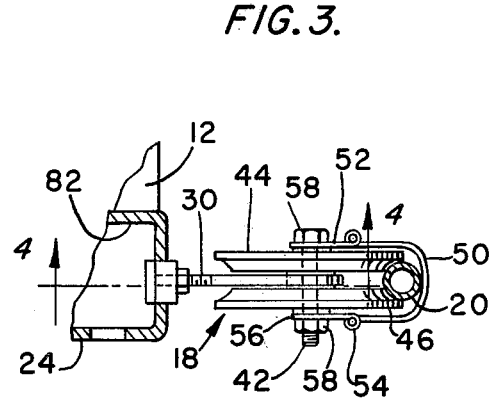
FIG. 3 is a view in section as seen along the line 3—3 in FIG. 2.
Figure 4:
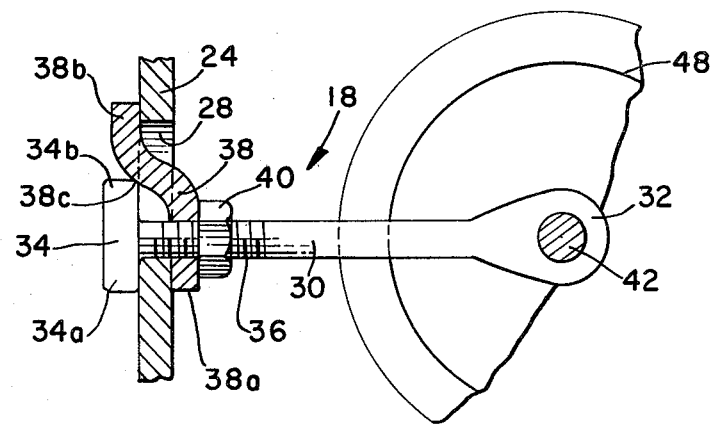
FIG. 4 is a view in section as seen along the line 4—4 in FIG. 3.

One form of anchoring device 18 may be seen in FIGS. 2-4. Anchoring device 18 or a plurality of anchoring devices has particular application in the mechanical support of a fire hose 20 throughout its extended length which may be about fifty (50) feet and in guiding the fire hose to a location distant from a hydrant (not shown) in a locker 22. As illustrated in FIG. 1, the locker is located in coaming 16 and a pair of fire hoses are supported by a number of anchoring devices mounted at corner fitting 24 in several of the cargo locations. Thus, the fire hose may be supported along the vertical rise of the tiered containers and on top of the container so that water may be played from a nozzle 26.

The anchoring device 18 may be received through any aperture 28 in the corner fitting denominated as "front" (or "rear") and "side", and through the aperture 29 (see FIG. 7) denominated as "top" to be secured in a horizontal or vertical attitude, respectively, for the described function. The anchoring device includes an element 30 of rod-like outline terminating in a bulbous portion 32 at one end and a base 34 at the other end. The rod-like element is threaded from the base, such as along a length 36 and both a dog or latch 38 and a nut 40 are received on the element. Both the base and the dog are of a width less than that of the minor dimension of aperture 28, shown as an oval in FIG. 2. The length and outline of the base and dog are such to permit the structures to pass at least partially through the aperture for securement of the anchoring device 18. Thus, the base 34 includes a pair of flat extensions 34a and 34b, one of which is adapted to engage the inner surface of the corner fitting 24 within the region at the bottom of the aperture. The other extension is engaged by the dog 38 generally within the plane of the inner surface. To effect this engagement, the dog is of a flattened S-shape outline (see FIG. 4) and when received through the aperture one end 38a is adapted to engage the outer surface of the corner fitting within the region at the bottom of the aperture, while the other end 38b is adapted to engage the inner surface of the corner fitting within the region of the top of the aperture. An intermediate portion 38c is adapted to engage the extension 34b. The base and dog (in flattened form) preferably are rectangular thereby to increase the surface-to-surface contact of the parts and the stability of the anchoring device in the mounted disposition. Releasable securement is accomplished by tightening the nut 40 toward the base 34.

The bulbous portion 32 of element 30 includes a pair of opposed flattened sides and a generally centrally located bore. A stub shaft 42 is received through the bore, and a pair of discs or wheels 44 and 46 are carried by the shaft on opposite sides of the element 30. Each of the wheels is chamferred arcuately toward one another to define a race 48 for the fire hose 20. A strap 50 may be provided to retain the fire hose in the race as it is played out, assisted by rotation of the wheels. The strap may be hingedly mounted to a bracket 52 and secured by a hasp 54 or the equivalent carried by a bracket 56. The brackets are carried by the shaft 42. A washer (not shown) assisting in free movement of the wheels likewise may be received on the shaft between each wheel and the bulbous portion. Any particular means such as a pair of nuts 58 may be received on opposite ends of the shaft to maintain the positional relationship of the wheels, brackets, and so forth. It is contemplated that the wheels may be disposed in any particular attitude irrespective of the mounting aperture for support and free playing out of the fire hose. Any means providing a self aligning swivel mount of element 30 in base 34 may be resorted to.

Reference now may be had to FIGS. 5-7 which illustrate a second form of anchoring device 60, likewise adapted to be releasably mounted on a corner fitting 24. Typically, the anchoring device will be mounted in a "top" aperture 29 and the anchoring device, once mounted is adapted to support a plurality of devices including safety and fire control devices.

The anchoring device 60 includes a base unit, mounting structure for mounting the base unit on the corner fitting and a fitting in the form of a socket for receipt of the safety or fire control devices. The base unit 62 generally is in the form of an upright member having an outer truncated, pyramidal wall. The base unit is open both at the top and bottom. For purposes to be discussed, the bottom of the base unit includes a shoulder 64 having a skirt 66 which depends from the periphery of the shoulder.

FIGS. 7 and 8 perhaps best illustrate the mounting structure and the manner of releasably mounting the base unit 62 of anchoring device 60 to the corner fitting 24. To this end, the mounting structure includes a latch 68 and a shaft 70 controlled in movement by handle 72 thereby to relocate the latch angularly through a 90° angle, from a first position to a second position. The second position is illustrated in dotted line in FIG. 8. The shaft is formed with an enlarged head 74 and is of non-circular cross-section throughout its length. The end, opposite head 74, is threaded along a length 75. The mounting structure further includes a bearing plate 76, a plug 78 and a spacer element 80. Both the plug and latch may be of similar outline and substantially coextensive in size with the aperture 29. The bearing plate is coextensive with the opening bounded by the internal surface of shoulder 64 and skirt 66 and received within the opening when the base unit is mounted. It is contemplated that the base unit may be attached to the bearing plate, as by welding, and in this manner of assembly the skirt 66 is found to be unnecessary. The spacer element, preferably in the form of a circular plate, is of a diameter less than the width or minor dimension of the aperture.

The anchoring device 60 with relative ease may be mounted on the corner fitting. To this end, the plug 78 is received in the aperture 29 at the "top" of the corner fitting by supporting the bearing plate 76 on the outside surface surrounding the aperture whereby both the spacer element 80 and latch 68 locate to a position within the corner fitting below the aperture. The corner fitting includes a hollowed out portion 82 for this purpose. Each of the mounting structures is provided with an opening and the shaft 70 extends therethrough. The openings in each of the spacer element and latch are non-circular to complement the cross-section of the shaft, whereas, the openings in the plug and bearing plate are circular. These latter openings are of a diameter larger than a diagonal dimension of the shaft so that the shaft 70 is capable of rotation relative to both the bearing plate and plug. The latch and spacer element will follow the rotation to relocate to the second position in mounting of the anchoring device. The latch, therefore, will engage the inside surface of the corner fitting around the aperture and the bearing plate 76 will engage the outside surface of the corner fitting around the aperture. The anchoring device, therefore, will be secured or engaged with the corner fitting for purposes of mounting the firefighting and/or safety equipment.

Two adjacent walls (see FIG. 5) are formed with openings which merge together at their junction. A cover plate 84 is secured on the base unit by any known means such as by a plurality of machine screws 90 or by welding or the equivalent thereby to close the opening. The cover plate includes a pair of slots 86 and 88 which likewise merge at the junction of the walls of the superposed cover plate, with each slot extending in a horizontal plane and terminating in a short, depending transverse length. The slots serve to guide the handle 72 in movement of the latch from the first to the second position. The handle is latched in each position. The full line position of the handle in FIG. 5 corresponds to the full line position of latch 68 in FIG. 8, and conversely the dotted line positions of the structure in these figures correspond.

A collar 92 is received on the shaft within the region of the opening in base unit 62 at the height of slots 86 and 88. The collar includes a pair of legs 94 and 96 which are spaced apart by a distance substantially equal to the width of the handle 72. The handle is mounted between the legs thereby to control movement of shaft 70, as described. The handle may be mounted by a pin 98 received through aligned openings in each of the handle and legs. The collar is adjustably located by a set screw 100 or the equivalent.

A sleeve or socket 102 is received on the base unit 62 opposite the mounting structure. The sleeve adapts the base unit for support of the safety and fire control devices. The sleeve is open throughout and one end terminates in a shoulder 104. The shoulder is directed inwardly thereby to provide a surface for support of a bearing plate 106, and, in turn, for support of the sleeve on the base unit. The shaft 70 extends through the bearing plate and a nut 108 preferably of self-locking type is threaded onto the end 75. A spacer 110 may be disposed between the bearing plate 106 and nut 108. The nut 108 may be threaded down on the end 75 of shaft 70 to obtain a relatively tight engagement of structures.

A stanchion 112 (see FIG. 9) may be received by the sleeve 102. The stanchion is in the form of an elongated post including a pair of grooves 114 and 116 located circumferentially therearound. The stanchion is received into the sleeve 102 and secured by a set screw(s) (see FIG. 7) capable of threadedly entering the groove 114. Preferably, the groove 114 is located near the end of the stanchion and the set screws will be disposed to permit maximum entry of the stanchion into the sleeve. A dust cover 120 is carried on the stanchion to close the end of sleeve 102.

The stanchion 112 may include a ring 122 of generally rectangular outline for attachment of a lifeline (not shown). Through the mounting of a number of anchoring devices 60, it will be possible to support the lifeline around the perimeter of the upper tier of containers. The ring is attached as by welding, for example, to a sleeve 124 which, in turn, is slipped on the stanchion. Any particular structure may be employed in longitudinal placement of the ring.

Figure 14:
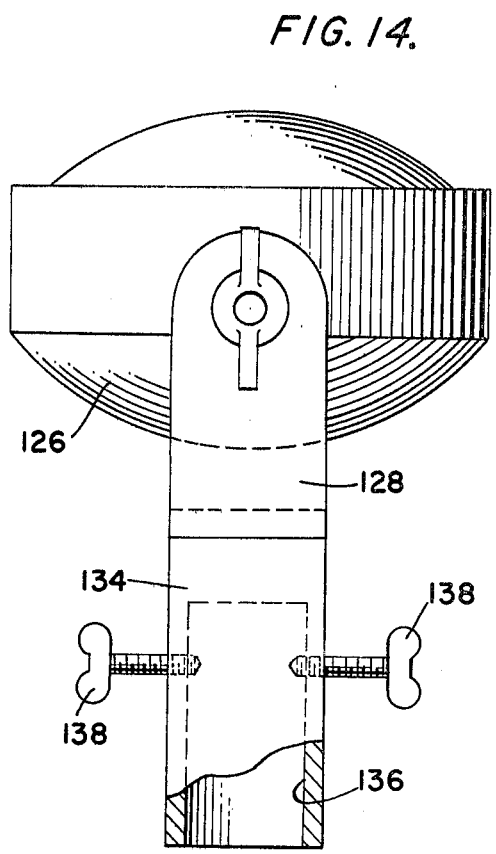
FIG. 14 is a view in elevation of a mount and cluster lamp for use with the stanchion of FIG. 9.
Figure 15:
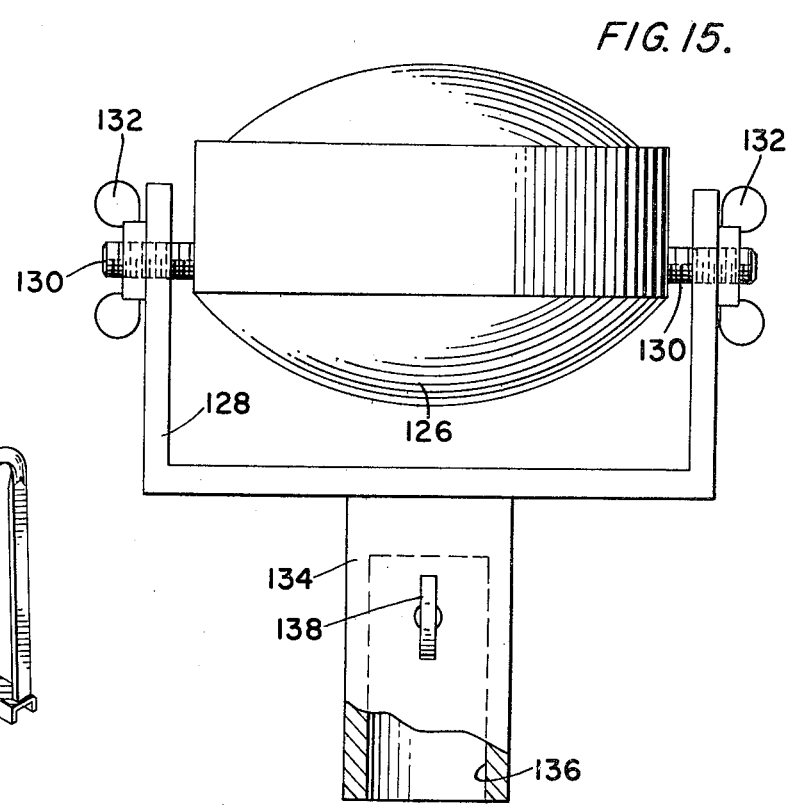
FIG. 15 is a view similar to that of FIG. 14 with the mount and cluster lamp illustrated in a position rotated through an angle of 90°.
Figure 20:
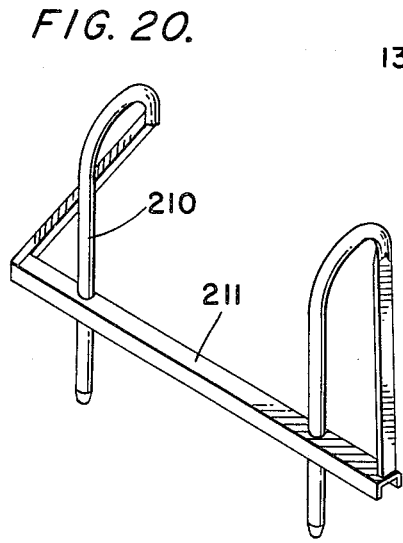
FIG. 20 is a perspective view of a hand rail adapted to be supported by the ladder.

The safety control devices further include a cluster lamp 126 (see FIG. 14). The cluster lamp includes a bracket 128 generally of U-shaped outline and the housing of the cluster lamp is mounted between the spaced-apart walls. The mounting structure may include a post 130 received through a pair of bores in the walls and a housing of the cluster lamp whereby the cluster lamp may be located to any particular attitude in a vertical plane. A pair of thumb screws 132 threadedly received at opposite ends of the post serve to locate the housing in any position of adjustment.

A mount 134 is provided for support of the bracket 128, as illustrated. The mount may be of any particular cross-section, such as rectangular including a circular bore from one end throughout a portion of the length toward the bracket 128. The mount is received on and releasably secured to stanchion 112 by a pair of set screws 138 cooperating with the groove 116. By releasing the engagement slightly, the mount may be rotated relative to the stanchion. Further and additional safety control devices having capability of mounting on the stanchion in the manner as described in connection with the cluster lamp may be apparent.

The fire control device 139 (see FIG. 12) in a manner similar to the mounting of the cluster lamp is received on the stanchion 112. To this end, the fire control device includes a mount 140, a lower portion of which duplicates the structure of the mount 134 of the cluster lamp. The upper portion provides a surface for a frame 142 comprising a pair of side members 142a and 142b. Both side members are of the outline of a sector and are supported on opposite sides of the mount. The side members are supported in a manner whereby they may be positioned in a plurality of attitudes in a vertical plane and secured in that attitude. A hose saddle 144 is disposed between the side members 142a and 142b and slightly inwardly of the end surface along the arcuate extent of the side members. A plurality of pins 146 received through both the side members and the hose saddle support the hose saddle in a mounted position.

Figure 13:
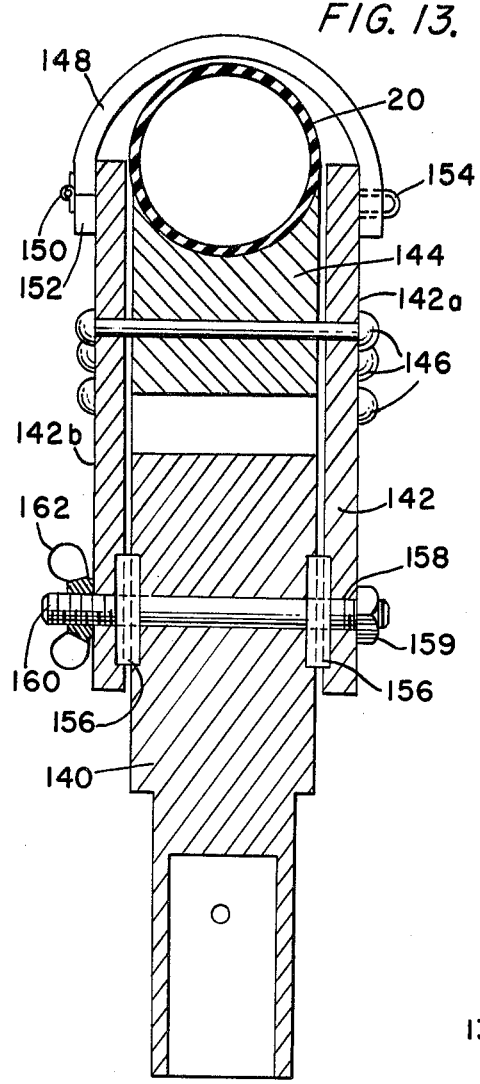
FIG. 13 is a view in section as seen along the line 13—13 in FIG. 12.

As perhaps best seen in FIG. 13, the hose saddle is concave toward the edge of the frame members and the concavity conforms to the outline of hose 20. A pair of straps 148 are disposed along the member in spaced relation thereby to hold the hose captive once it is received by the fire control device 139. The strap may be hinged to the side member 142a at 150 and fastened to side member 142b by a hasp 154.

The frame 142, capable of being positioned in a plurality of attitudes in a vertical plane, is supported on mount 140 by a member 156 in the form of a disc received between the mount and the side members 142a and 142b. The outer surfaces of each disc member include a plurality of ribs extending radially and complementary ribs are formed on the side members. Each disc member 156 is received in a recess in the mount to extend into similar recesses in the inner surface of each of the side members. The complementary ribs as apparent are formed at the base of the recess in each side member. The disc members 156, the mount 140 and each of the side members 142a and 142b are provided with a circular bore and a pin 158 for support of the structure is received therethrough. The pin may carry an enlarged head or a lock nut 159 at one end and is threaded at 160 at the opposite end. A clamp 162 is threaded on the pin into tight engagement with the side member 142a or a washer (not shown) and in this manner any adjusted engagement of the side members may be maintained.

A further form of anchoring device 164 may be seen to advantage in FIGS. 17 and 19. This form of anchoring device may be utilized in the mounting of a ladder 166 to a container. The ladder preferably is of a length, with capability of adjustment for accommodation to containers of between 8-9 or possibly 9½ feet in height, to extend between a pair of vertically adjacent corner fittings 24 of the same container. The ladder has capability to receipt of a further ladder thereby to provide a means for climbing to the top of the containers in any particular location of containers on the deck of the container-ship, as seen in FIG. 1. This will be described.

With continued reference to FIGS. 17 and 19, the anchoring device 164 is used to mount both the top and bottom portions of the ladder 166 to the corner fittings 24. For all intents and purposes, the anchoring device 164 is similar to the anchoring device 60 thereby to function in mounting in a similar manner; and the upper anchoring device substantially duplicates the lower anchoring device. Thus, the anchoring device includes a latch 168, a spacer 170, a plug 172, a face plate 174 and a shaft 176 received through each of the aforementioned elements. The shaft 176 carries a head 178 of enlarged outline at one end to provide a bearing surface for latch 168. The shaft is of a non-circular cross-section from the head lengthwise to a threaded end 180.

The latch 168 and plug 172 are both of an outline to conform with an aperture 28 in corner fitting 24, described in connection with the discussion of latch 68 and plug 78. Similarly, the latch includes an opening of an outline complementary to the cross-section of shaft 176; whereas, the plug 172 is provided with an enlarged opening which may be circular but in any event of a size to permit free rotation of the shaft 176, for purposes as described. The spacer 170 includes an opening also complementary to the cross-section of shaft 176 and is received in mounted orientation between the latch and the plug. The face plate 174 as the plug to which it may be mounted remains stationary upon rotation of shaft 176. It serves as a bearing plate against the outer surface of the corner fitting 24. A bracket 188, and the face plate, have a width generally equal to the width of the ladder 166. The bracket is of U-shaped outline and is mounted by one leg to the face plate. Any manner of mounting, such as welding, may be employed for this purpose. As may be seen in FIG. 17, shaft 176 extends through the bracket and, in the manner heretofore described, is capable of relative movement. The bracket 188 comprises the upper bracket and a bracket 190 comprises the lower bracket. Bracket 190 is of L-shaped outline and carried in a similar fashion at the lower anchoring device. A handle 192 is received on shaft 176. The handle includes an opening of complementary outline to that of the cross-section of the shaft thereby to carry out a latching operation when the shaft is rotated about its axis and, preferably, it is elongated thereby to provide a degree of mechanical advantage in rotating the shaft and latch. Thus, the latch will relocate from a first position in alignment with aperture 28 to a second position about 90° removed from the first position, at which the latch engages the inner surface of the corner fitting. The mounted securement of anchoring device 164, thus, is as previously described in connection with the discussion of anchoring device 60.

A lock nut 196 is threaded on the shaft 176 to maintain the assembled relation of the described parts.

In mounting a series of ladders 166 thereby to gain access to the top of a container or stack of containers, only the first of the ladders will require mounting to a container at the top and bottom. The second, third and so on ladders will derive stability by receipt of the bottom end of the ladder in a lower ladder with its top end secured to the container by the anchoring device 164, and each ladder will be mounted at three points, as will be described more fully. A safety belt (not shown) may be employed to permit use of both hands in erecting the ladders. The safety belt may be conveniently releasably fastened to the ladder by hooks (not shown).

The ladder 166 includes a retaining bracket 198 duplicated on both sides of the ladder for support of the ladder on the upper bracket 188 and, in turn, for support of a ladder rail 200 and a runner rail 202. As best seen in FIG. 18, each retaining bracket and the runner rail comprising a pair of side elements are L-shaped in outline. The ladder rail, likewise, comprising a pair of side elements are U-shaped in outline and each side element is mounted in any manner as by welding to the long leg of each of the retaining brackets. In this manner there is provided a track bounded by each of the side elements of the ladder rail and the short leg of the retaining brackets throughout the length of each of the retaining bracket and ladder rail. The side elements of the ladder rail mount a plurality of rungs 204, and the side elements of the runner rail mount a plurality of rungs 206. All of the rungs are of U-shaped outline as seen from the side and are spaced apart according to generally recognized standards.

As indicated, the upper bracket 188 is of U-shaped outline and the other leg is mounted in any manner as by welding to the side elements of ladder rail 200, see FIG. 17. For this purpose, the side elements of the ladder rail extend upwardly from the retaining brackets.

Both the upper bracket 188 and the lower bracket 190 are provided with a pair of openings for purposes as will be described. A pipe section 208 is mounted to the upper bracket generally within the region of the sides, coaxial of each opening, to provide a pair of sockets for receipt of pins of the next to be erected ladder or a pair of depending ends of a handrail 210. The handrail includes a step 211 to assist in gaining access to the top of the containers.

A pair of pins 212 are mounted by the lowest rung 206 to be coaxial with each pipe section and as illustrated in FIGS. 16 and 17 the pins enter into the holes in lower bracket 190. By virtue of the fact the runner rail is capable of movement within the track heretofore decribed, the ladder 166 may be extended to a length required thereby to secure the anchoring device 164 carried by the ladder rail 200 into an aperture 28 and receive the pins 212 into the holes of the lower bracket 190. By providing each pin with a frustoconical end, the receipt of the pins into the openings in bracket 190 will be facilitated. Thus, each ladder is supported at three points; one point of support at the apex of a triangle being provided by an anchoring device 164, while the other points of support are provided by the individual pins 212 cooperating either in a socket supported by upper bracket 188 or a hole formed in lower bracket 190.

Normally, a plurality of ladders will be erected thereby to gain access to the top of the containers. Thus, it is preferable that the ladder 166 be lightweight so that it may be handled easily, yet it should provide sufficient strength to support several hundred pounds. As previously mentioned, the ladder will provide hooks or the equivalent to which a safety strap may be attached and one of a pair of cables 214 each connected at one end to the upper handle 192 may be manipulated from below to rotate the shaft 176 and latch 168 to and from the first and second positions. If the handle, in each position, is located at an angle to the vertical, the latch may be readily rotated into a locked position by pulling on one or the other of the cables, or similar actuating means such as a linkage.

The particular materials which may be employed in the safety and fire control devices necessarily should be characteristically defined as capable of ready fabrication and mounting for example, by welding as required from the previous discussion, it should display strength and among characteristics it should be capable of withstanding the corrosive effects of the elements encountered at sea. Materials providing these characteristics are well known. The container 12 and particularly the corner fittings 24, previously described as conforming to a standard, may be as set out in the "International Standard ISO 1161", Series 1 Freight Containers—Corner Fittings—Specification, First Edition 1976-07-15.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

Having described the invention, what is claimed is:

1. An anchoring device adapted to be releasably mounted on a corner fitting of a container including a plurality of apertures providing openings to a hollowed-out interior of said corner fitting along mutually perpendicular axes, said anchoring device including
   a) a body having
      (1) bearing means at one end for bearing engagement with inner and outer surfaces of said corner fitting adjacent an aperture, said bearing means including (i) a plate received over an aperture for support on the outer surface of said corner fitting, and (ii) a latch received in said hollowed-out interior, said latch adapted to be rotated between a first position and a second position for engagement within the hollowed-out interior with the inner surface on opposite sides of said aperture, and (2) means at the other end of said body adapted for mounting safety control means;

b) means cooperating with said body including (1) a shaft, said shaft extending through and rotatable relative to said plate and supporting said latch at one end for conjoint rotation, (2) a handle for rotating said latch between said positions, and (3) means mounting said handle on said shaft; and c) a base unit comprising a part of said body surrounding said shaft and formed to a truncated, pyramidal outline, means defining a slot in each of a pair of adjacent sides of said base unit communicating at the junction of the sides, each slot terminating in a depending latching length, and said handle extending through said slot and movable into and between latching lengths which comprise said first and second positions of said latch, respectively.

2. In combination:

a) an anchoring device adapted to be releasably mounted on a corner fitting of a container including a plurality of apertures providing openings to a hollowed-out interior of said corner fitting along mutually perpendicular axes, said anchoring device comprising a body including a base unit having (1) bearing means at one end of said base unit for bearing engagement with inner and outer surfaces of said corner fitting adjacent an aperture, said bearing means including (i) a plate received over an aperture for support on the outer surface of said corner fitting, said plate located at one end of said base unit, and (ii) a latch received in said hollowed-out interior, said latch adapted to be rotated between a first position and and second position for engagement within the hollowed-out interior with the inner surface on opposite sides of said aperture;

(2) means cooperating with said body for moving said bearing means into engagement with said surfaces including (i) a shaft, said shaft extending through and rotatable relative to said plate, and fixed to said latch at one end whereby said latch and shaft move conjointly, (3) means for mounting said shaft within said base unit, said mounting means cooperating with said base unit so that upon rotation of said shaft to relocate said latch to said second position said base unit is locked against said plate to prevent disengagement from said outer surface and including (i) a shoulder, said shoulder formed at the other end of said base unit, (ii) a bearing plate received around said shaft and supported by said shoulder, and (iii) means for locating said shaft relative to said bearing plate;

(4) means at the other end of said body adapted for mounting selectively and interchangeably one of individual safety control means, said mounting means including (i) a sleeve, said sleeve having a cylindrical cross-section throughout, and (ii) an inner annular shoulder at one end of the sleeve, said inner annular shoulder received on said base unit shoulder, and said bearing plate received on said sleeve shoulder for securing said shoulders, (iii) and a stanchion received by said sleeve;

b) safety control means mounted by said anchoring device.

3. The anchoring device of claim 2 including a cap, said cap carried by said stanchion for closing the end of said sleeve, and means for releasably securing said stanchion in said sleeve.

4. The anchoring device of claim 3 including a ring, said ring carried by said stanchion and adapted to support a lifeline.

5. The anchoring device of claim 2 wherein said safety control means includes a support, a saddle having an arcuate race adapted to support a hose, and means mounting said hose support, said hose mounting means adapted to be received on said stanchion.

6. The anchoring device of claim 2 wherein said safety control means includes a lamp, a mount for said lamp, and said lamp mount including a bore for receipt on said stanchion.

7. An anchoring device adapted to be releasably mounted on a corner fitting of a container to extend therefrom one of a vertical or horizontal attitude by intercooperation in any aperture of a plurality of mutually perpendicular apertures of said corner fitting each of which provides an opening to a hollowed-out interior, said anchoring device including a body which extends outwardly from said corner fitting, bearing means carried at one end of said body including inner and outer bearing elements for bearing engagement, respectively, with the inner and outer surface of said corner fitting adjacent said aperture, said inner bearing element being of a size for receipt into said hollowed-out interior along one path of movement to a final releasably mounted position as said outer bearing element moves into engagement with said outer surface, means carried by said body for moving said inner bearing element into engagement with said inner surface, and means at the other end of said body adapted for mounting both selectively and interchangeably safety control means, said means for mounting said safety control means comprising a sleeve, a stanchion, means for releasably securing said stanchion in said sleeve, a cap carried by said stanchion for closing the end of said sleeve and stabilizing said stanchion, and means for mounting said sleeve on said body.

8. The anchoring device of claim 7 including a ring, said ring carried by said stanchion and adapted to support a lifeline.

9. An anchoring device adapted to be releasably mounted on a corner fitting of a container to extend therefrom in one of a vertical or horizontal attitude by intercooperation in any aperture of a plurality of mutually perpendicular apertures of said corner fitting each of which provides an opening to a hollowed-out interior, said anchoring device including a body which extends outwardly from said corner fitting, bearing means carried at one end of said body including inner and outer bearing elements for bearing engagement, respectively, with the inner and outer surface of said corner fitting adjacent said aperture, said inner bearing element being of a size for receipt into said hollowed-out interior along one path of movement to a final releasably mounted position as said outer bearing element moves into engagement with said outer surface, means carried by said body for moving said inner bearing element into engagement with said inner surface, and means at the other end of said body adapted for mounting both selectively and interchangeably safety control means, said means for mounting said safety control means comprising a sleeve, a stanchion received by said sleeve, means for mounting said sleeve on said body, and wherein said safety control means includes a support, a saddle having a race adapted to support a hose, and means mounting said hose support on said stanchion.

10. An anchoring device adapted to be releasably mounted on a corner fitting of a container to extend therefrom in one of a vertical or horizontal attitude by intercooperation in any aperture of a plurality of mutually perpendicular apertures of said corner fitting each of which provides an opening to a hollowed-out interior, said anchoring device including a body which extends outwardly from said corner fitting, bearing means carried at one end of said body including inner and outer bearing elements for bearing engagement, respectively, with the inner and outer surface of said corner fitting adjacent said aperture, said inner bearing element being of a size for receipt into said hollowed-out interior along one path of movement to a final releasably mounted position as said outer bearing element moves into engagement with said outer surface, means carried by said body for moving said inner bearing element into engagement with said inner surface, and means at the other end of said body adapted for mounting both selectively and interchangeably safety control means, said means for mounting said safety control means comprising a sleeve, a stanchion received by said sleeve, means for mounting said sleeve on said body, and wherein said safety control means includes a lamp, and means for mounting said lamp on said stanchion.

11. In combination with a corner fitting of a container including a plurality of mutually perpendicular apertures each providing an opening to a hollowed-out interior of said corner fitting along mutually perpendicular axes of an anchoring device releasably mounted in any aperture of said plurality of apertures on said corner fitting to extend therefrom in one of a vertical or horizontal attitude, said anchoring device comprising a body, bearing means carried at one end of said body including inner and outer bearing elements for bearing engagement, respectively, with inner and outer surfaces of said corner fitting adjacent the aperture, said inner bearing element being of a size for receipt into said hollowed-out interior along one path of movement to a final releasably mounted position as said outer bearing element moves into engagement with said outer surface, means carried by said body for moving said inner bearing element into engagement with said inner surface, and means at the other end of said body adapted for mounting selectively and interchangeably safety control means, said means for mounting safety control means comprising a sleeve, a stanchion, means for releasably securing said stanchion in said sleeve, a cap carried by said stanchion for closing the end of said sleeve and stabilizing said stanchion, and means for mounting said sleeve on said body.

12. The anchoring device of claim 11 including a ring, said ring carried by said stanchion and adapted to support a lifeline.

13. In combination with a corner fitting of a container including a plurality of mutually perpendicular apertures each providing an opening to a hollowed-out interior of said corner fitting along mutually perpendicular axes of an anchoring device releasably mounted in any aperture of said plurality of apertures on said corner fitting to extend therefrom in one of a vertical or horizontal attitude, said anchoring device comprising a body, bearing means carried at one end of said body including inner and outer bearing elements for bearing engagement, respectively, with inner and outer surfaces of said corner fitting adjacent the aperture, said inner bearing element being of a size for receipt into said hollowed-out interior along one path of movement to a final releasably mounted position as said outer bearing element moves into engagement with said outer surface, means carried by said body for moving said inner bearing element into engagement with said inner surface, and means at the other end of said body adapted for mounting selectively and interchangeably safety control means, means for mounting said safety control means comprising a sleeve, a stanchion received by said sleeve, means for mounting said sleeve on said body, and wherein said safety control means includes a support, a saddle having a race adapted to support a hose, and means mounting said hose support on said stanchion.

14. In combination with a corner fitting of a container including a plurality of mutually perpendicular apertures each providing an opening to a hollowed-out interior of said corner fitting along mutually perpendicular axes of an anchoring device releasably mounted in any aperture of said plurality of apertures on said corner fitting to extend therefrom in one of a vertical or horizontal attitude, said anchoring device comprising a body, bearing means carried at one end of said body including inner and outer bearing elements for bearing engagement, respectively, with inner and outer surfaces of said corner fitting adjacent the aperture, said inner bearing element being of a size for receipt into said hollowed-out interior along one path of movement to a final releasably mounted position as said outer bearing element moves into engagement with said outer surface, means carried by said body for moving said inner bearing element into engagement with said inner surface, and means at the other end of said body adapted for mounting selectively and interchangeably safety control means, means for mounting said safety control means comprising a sleeve, a stanchion received by said sleeve, means for mounting said sleeve on said body, and wherein said safety control means includes a lamp, and means for mounting said lamp on said stanchion.

* * * * *